United States Patent [19]

Stork et al.

[11] Patent Number: 5,157,275

[45] Date of Patent: Oct. 20, 1992

[54] CIRCUIT EMPLOYING LOGICAL GATES FOR CALCULATING ACTIVATION FUNCTION DERIVATIVES ON STOCHASTICALLY-ENCODED SIGNALS

[75] Inventors: David G. Stork, Stanford; Ronald C. Keesing, Menlo Park, both of Calif.

[73] Assignees: Ricoh Corporation, Menlo Park, Calif.; Ricoh Company, Ltd., Japan

[21] Appl. No.: 673,804

[22] Filed: Mar. 22, 1991

[51] Int. Cl.$^5$ .............................................. G06G 7/00
[52] U.S. Cl. ................... 307/201; 307/490; 395/27
[58] Field of Search .............. 307/201, 490; 364/513; 395/24, 27

[56] References Cited

U.S. PATENT DOCUMENTS

| | | | |
|---|---|---|---|
| 4,893,255 | 1/1990 | Tomlinson, Jr. | 364/513 |
| 4,912,651 | 3/1990 | Wood et al. | 364/513 |
| 4,916,635 | 4/1990 | Singer et al. | 364/513 |
| 4,972,363 | 11/1990 | Nguyen et al. | 307/201 X |
| 5,003,490 | 3/1991 | Castelaz et al. | 364/513 |
| 5,046,020 | 9/1991 | Filkin | 364/513 |
| 5,052,043 | 9/1991 | Gaborski | 364/513 X |

OTHER PUBLICATIONS

*Neurocomputing*, Chapt. 6, R. Hecht–Nielsen, Addison Wesley Pub. Co., 1990, pp. 164–219.

Murray & Smith, "Asynchrorous VLSI Neural Networks Using Pulse–Stream Arithmetic," *IEEE J.S.S.C.*, vol. 23, No. 3, Jun. 1988, pp. 688–697.

*Primary Examiner*—David Hudspeth
*Attorney, Agent, or Firm*—Heller, Ehman, White & McAuliffe

[57] ABSTRACT

A circuit employing logical gates for calculating activation function derivatives on stochastically encoded signals. In one embodiment a two input nonlinear circuit calculates neuron activation functions suitable for gradient-descent learning.

3 Claims, 3 Drawing Sheets

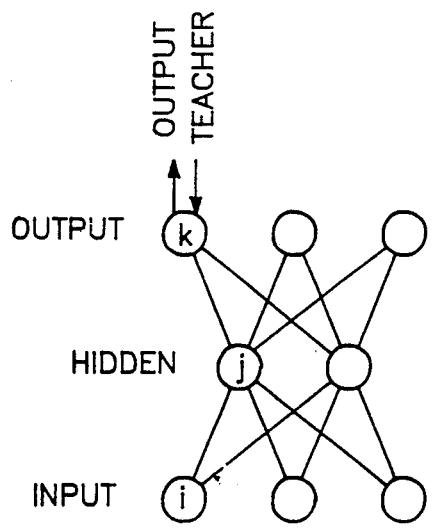
FIG.—1
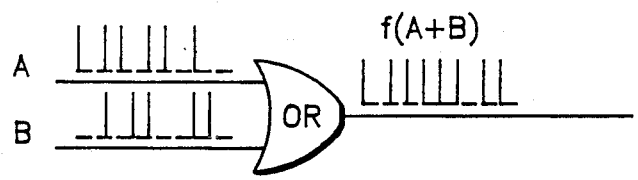
FIG.—2
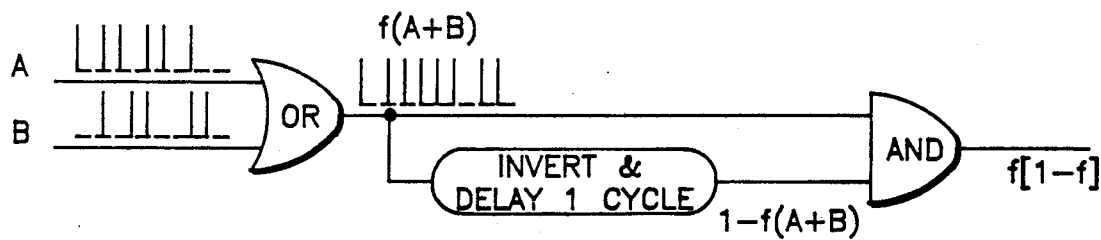
FIG.—4

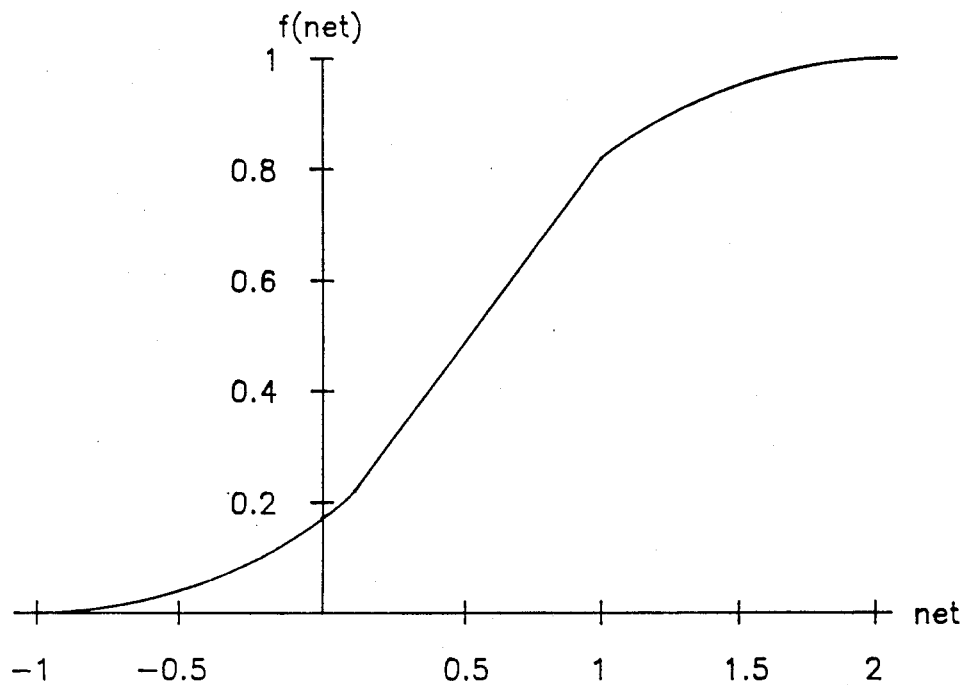
FIG.—3
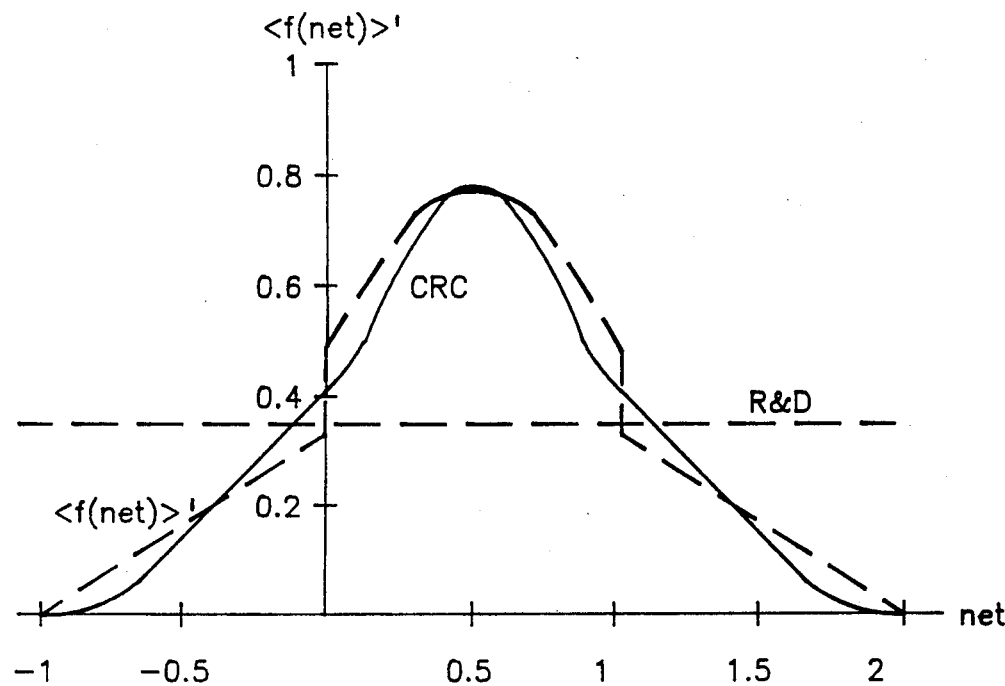
FIG.—5

CIRCUIT EMPLOYING LOGICAL GATES FOR CALCULATING ACTIVATION FUNCTION DERIVATIVES ON STOCHASTICALLY-ENCODED SIGNALS

BACKGROUND OF THE INVENTION

The present invention relates to a circuit employing logical gates for calculating activation function derivatives on stochastically encoded signals.

One of the most popular and successful neural network learning algorithms is backpropagation[1] which has had a wide following, and a great number of application successes. It is natural that VLSI neural chip designers should address the design of a backpropagation chip. While theories underlying many other network algorithms are sometimes vague, ill-defined, and hence operation is based on heuristics, backpropagation has a firm computational foundation.

A typical backpropagation network consists of an input layer, a hidden layer, and an output layer. FIG. 1 shows a standard three-layer backpropagation network, having three input units, two hidden units, and three output units.

Each neuron in the network takes as its input the sum of the outputs of pre-synaptic neurons, each weighted by the connection linking the neurons, to form a net activation, called net. The neuron emits an output that is a monotonically increasing, nonlinear differentiable function f(net), often chosen to be a sigmoid—$1/(1+e^{-\beta net})$. Thus, for any unit j, we have $$net_j = \sum_i W_{ji} O_i \qquad [1]$$

where the summation is over the outputs of each presynaptic neurons.

Each neuron's output is a nonlinear function of net:

$$o_j = f(net_j) \qquad [2]$$

The goal is to have the network produce the desired output when an appropriate input is presented. The network learns from a large set of pairs of input and desired output patterns, where the desired output patterns are provided by a teacher (supervised learning).

One way to express the goal of the network is to form a global error function, $$E = \frac{1}{2} \sum_k (t_k - o_k)^2 \qquad [3]$$

this term itself summed over all input-desired output pattern pairs. Training the network consists of setting all the weights so as to reduce the global error. During training, each weight $w_{hi}$ is changed by an amount given by the general form:

$$\Delta w_{ji} = \eta \delta_j \rho_i \qquad [4]$$

where $\eta$ is a small learning rate constant, $o_i$ is the presynaptic output activity, and $\delta_j$ is a local error, computed at each neuron. Given the definition $$\frac{\partial o_j}{net_j} = f'(\partial net_j) \qquad [5]$$

it can be shown that for an output unit (labelled k in FIG. 1), this local error is:

$$\delta_k = (t_k - O_k) f'(net_k) \qquad [6]$$

where $t_k$ is the signal provided by the teacher to the output unit. For a hidden unit (labelled j in FIG. 1), which has no direct teaching signal, the local error is:

$$\delta_j = f'(net_j) \sum_k \delta_k w_{kj} \qquad [7]$$

where $\delta_k$ is the local error at each of the output neurons.

With the local errors calculated this way, and with a few very lax conditions met, the network acts to reduce its global error upon each learning trial. Thus the learning can be described as an error gradient-descent in weight space.

Note very carefully, however, that f'(net) appears in equations [5] and [7]. Thus f'(net) must be calculated at every output and hidden neuron in order that the backpropagation algorithm proceed. Although there are some application problems for which f'(net) might not need to be calculated, these are rare, and are very simple problems, where the power of backpropagation is not necessary.

SUMMARY OF THE INVENTION

The present invention provides a novel method and implementation circuit for calculating derivatives of nonlinear activation functions. Such derivatives are essential for many neural learning algorithms, such as backpropagation. The present method uses a stochastic spike frequency coding scheme employed in a neural network chip such as one manufactured by Ricoh Corporation, as well as in other neural chips. The central idea builds upon the fact that for an activation function f(net) that is sigmoidal, the derivative $df/d(net) = f(1-f)$. The new circuit uses a one-pulse delay to decorrelate two signals f—f and (1-f)—in order that their multiplication can be accomplished using a logical AND gate.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 depicts a standard three-layer backpropagation network.

FIG. 2 depicts a two input nonlinear circuit for calculating neuron activation function.

FIG. 3 depicts an effective nonlinear transfer function.

FIG. 4 depicts a novel two-input nonlinear circuit according to the present invention.

FIG. 5 depicts a derivative of the expectation value of the activation function.

DETAILED DESCRIPTION OF THE PREFERRED EMBODIMENTS

Figure 6:
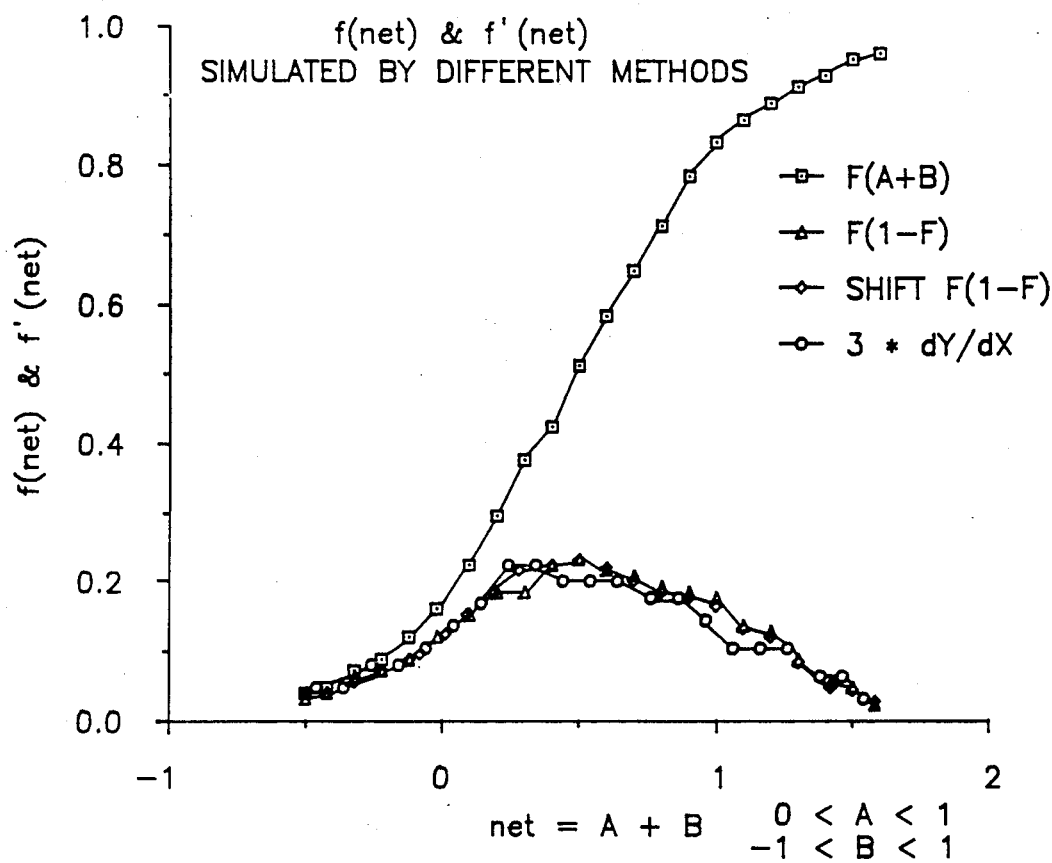
FIG. 6 depicts an expectation value of the transfer function.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The Neural Chip

A neural learning chip such as one made by Ricoh Corporation utilizes a spike frequency coding scheme, in which activations, outputs and even weights are represented by an averaged spike frequency in a given interval. Although that interval has been chosen to be 80 spike positions, that value is not crucial, and will not figure into our calculations. The nonlinear output of a neuron is computed rapidly and efficiently, by means of a logical OR gate operating on the spike trains representing input signals A and B (FIG. 2).

FIG. 2 shows a two-input nonlinear circuit for calculating neuron activation function, f(net), used in RICOH's VLSI neural chip for gradient-descent learning. The circuit shown is for two positive signals, $0<A<1$ and $0<B<1$ performs the logical operation A v B at each spike interval. For the case of subtraction, e.g., net=A−B, the RICOH chip performs the logical operation A∧B, where the spike frequency in B is equal to IBI (not shown).

Note that at low values of A and of B (very few spikes), the chance that two spikes will arrive simultaneously is small, and thus the output will be linearly dependent upon the sum, net=A+B, i.e., f(net)=net. At higher values of net, however, the probability that spikes arrive simultaneously increases, and any such resulting coincidence of spikes effectively reduces the output, since two input spikes lead to just one spike output. Thus the circuit leads to the saturating nonlinearity shown in FIG. 3.

FIG. 3 shows an effective nonlinear transfer function, f(net), derived analytically from the circuit in FIG. 2 for the two-input case in which one input is positive, and the other can be either positive or negative. Shown is the expectation value of the output as a function of net =A+B, averaged over all possible configurations of A and B and all possible spike train distributions. It is assumed that the probability distribution for A and B is uniform, and that all spike trains are random.

The kinks in the curve f(net) at net=0 and net=1 are due to the fact that at these values, new modes or combinations of values of A and B are available. Thus for instance, net=1.1 can be obtained only by the case A>0 and B>0. For the nearby value net=0.9, however, can be obtained by A>0 and B>0 (A=0.5, B=0.4, for instance) as well as by A>0 and B<0 (A=1.0, B=−0.1, for instance). These new modes change the distribution of the curve, introducing the discontinuities in its derivative.

The RICOH neural chip does not, however, calculate f'(net). Thus its learning is not gradient-descent backpropagation[2].

The present invention employs the signal encoding scheme of a suitable neural learning chip such as the RICOH chip, and logical devices of the type utilized on the chip in order to rapidly and efficiently calculate f'(net). This will then permit the proper backpropagation learning rules to be performed by the chip.

The approach is guided by the recognition that for sigmoidal transfer functions, $$f(\text{net}) = \frac{1}{1 + e^{-\beta \text{net}}} \quad [8]$$

the derivative obeys the equation $$\frac{df(\text{net})}{d(\text{net})} = \beta f(1 - f) \quad [9]$$

Because the transfer function in FIG. 3 closely approximates a sigmoidal function, the quantity f(1−f) will closely approximate f'(net).

FIG. 4 shows a novel two-input nonlinear circuit for calculating derivative of activation function, for possible use in VLSI chips for performing gradient-descent learning. The present invention performs the f'=f(1−f) calculation using the circuit of FIG. 4, where 1−f is found by inverting a copy of the f signal. Then the two signals are multiplied by the logical AND gate operating on spikes.

It is also essential that one of the signals input to the AND gate be delayed by one clock cycle (or more). In FIG. 4 this delay is shown on the 1−f line. Without such a delay to decorrelate the two signals at the AND gate, those two signals would be perfectly anti-correlated, and thus the output of the AND gate would be zero identically. The clock delay is sufficient to decorrelate the two signals, enabling stochastic calculation to proceed (see below).

Another approach—rerandomizing one of the signals instead of merely time shifting it—is computationally very costly, and moreover introduces numerical errors, since it is not guaranteed to produce the same number of spikes after rerandomization. There is a very small and constant error in our proposed method due to the possible "loss" of a spike due to shifting outside the integration window, but this error is too small to be of any consequence.

FIG. 5 shows analytic calculations for the derivative of the expectation value of the activation function d<f(net)>/d(net). The dashed line is the derivative of the RICOH activation function (cf. FIG. 3). It is the function we seek to approximate. The solid line is the output of FIG. 4, assuming the inputs to the AND gate are uncorrelated through rerandomization of one of the signals.

Since the current RICOH chip does not perform the calculation of the derivative of the activation function, its algorithm is equivalent to trying to approximate the derivative in backpropagation with a straight line, as shown.

FIG. 5 shows the derivative of the expectation value of the activation function—d<f(net)>/d(net)—as determined analytically from the two-input activation function itself (dashed line). The solid line shows the derivative as calculated by the novel circuit of the present invention.

FIG. 6 shows simulations of the circuits themselves. The transfer function f(net) was obtained by simulating the OR gate; it closely approximates the analytic curve in FIG. 3, giving a check on methods of the present invention.

FIG. 6 shows expectation value of the transfer function-, $<f(net)>$, along with its derivative, $d<f(net)>/d(net)$, as determined by simulating digital VLSI logic circuits.

Figure 7:
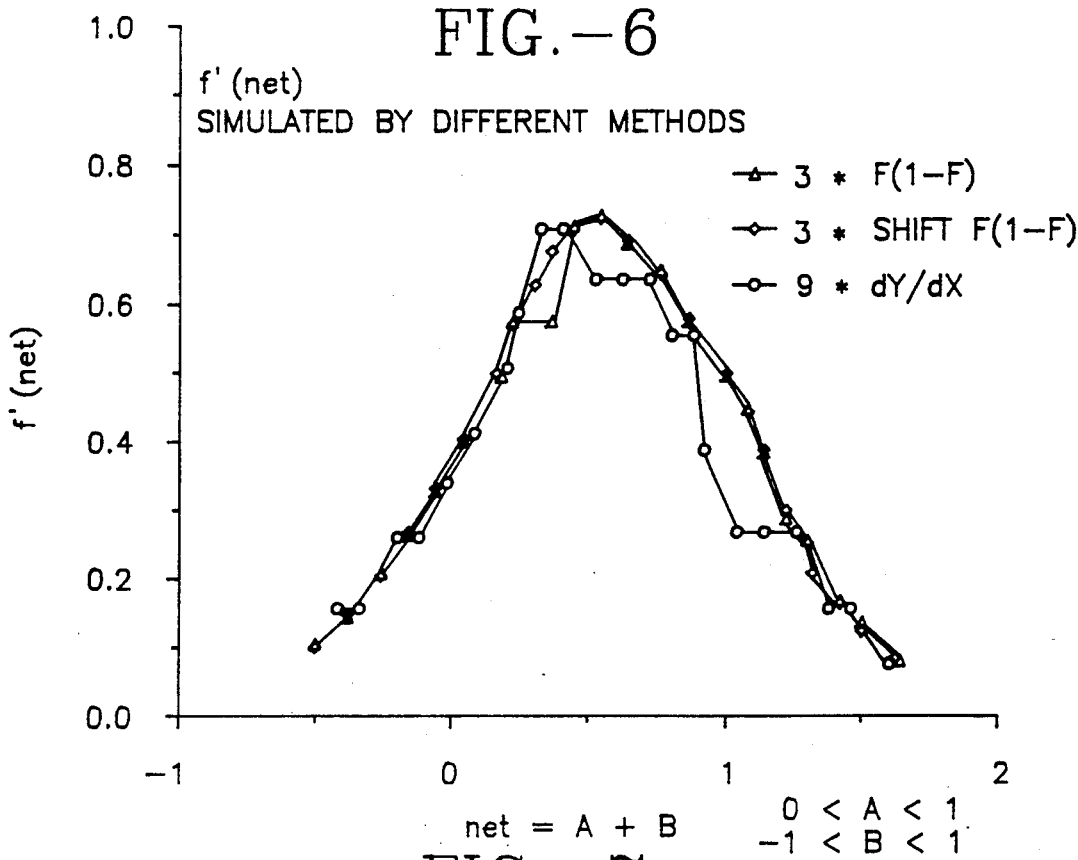
FIG. 7 depicts a derivative of the expectation value of the activation function.

The derivatives alone are replotted in FIG. 7, scaled for easy comparison. FIG. 7 shows the derivative of the expectation value of the activation function—$d<f(net)>/d(net)$—as determined analytically from the two-input activation function itself (dashed line). The circles show the numerical derivative of the transfer function to be approximated.

The curve marked 9*dy/dx was found by taking the numerical derivative of f—this derivative is, hence, the function to be approximated. (Note that the kink at net=1 is evident, even in this limited simulation.) The curve marked 3*F(1−F) describes the output of the AND gate if one of its inputs is rerandomized to decorrelate the two signals. Finally, the curve marked Shift F(1−F) describes the present circuit, employing the single pulse shift to decorrelate the two inputs to the AND gate.

It is quite clear that the f'(net) calculation performed by the present invention closely approximates that necessary for proper implementation of back-propagation. It is believed that the present method can be of use in a suitable neural learning chip.

The foregoing descriptions of specific embodiments of the present invention have been presented for purposes of illustration and description. They are not intended to be exhaustive or to limit the invention to the precise forms disclosed, and it should be clear that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

References

Rumelhart, D. E., G. E. Hinton, and R. I. Williams, "Learning Internal Representations by Error Propagation," Chapter 8, pp. 318-362 in Parallel Distributed Processing (D. E. Rumelhart, I. McClelland, eds), MIT Press (1986).

Furuta, T., H. Horiguchi, and H. Eguchi, "Neuron model utilizing pulse density and its self-learning circuits,"RICOH Technical document (1990).

Tomlinson, M. S., Jr., D. I. Walker, and M. A. Sivilotti, "A Digital Neural Network Architecture for VLSI," Proc. International Joint Conference on Neural Networks-90, San Diego, 11-545-550 (1990).

We claim:

1. A nonlinear circuit for calculating activation function derivatives on stochastically encoded signals, said circuit comprising an OR gate for receiving at least first and second inputs representative of first (A) and second (B) stochastically encoded signals each having a spike frequency coding over a given interval, said first gate forming as an output the logical OR function f(A+B), a delay gate for receiving said f(A+B) function to form an inverted and delayed output 1−f(A+B), an AND gate for receiving said f(A+B) and 1−f(A+B) signals to form the approximate derivative quantity output signal f(1−f).

2. The circuit as in claim 1 wherein said delay gate delays one of said f(A+B) signals by at least one clock cycle so as to decorrelate said signals.

3. In a circuit for calculating activation function. derivatives on stochastically encoded signals, the method comprising the steps of receiving at least first and second inputs representative of first (A) and second (B) stochastically encoded signals each having a spike frequency coding over a given interval to form as an output the logical OR function f(A+B), receiving said f(A+B) function to form an inverted and delayed output 1−f(A+B), and receiving said f(A+B) and 1−f(A+B) signals to form the approximate derivative quantity output signal f(1−f).

* * * * *